March 28, 1961 T. P. CALLAHAN 2,976,720
APPARATUS FOR MEASURING THE VAPOR CONTENT OF FLUIDS
Filed April 9, 1959 3 Sheets-Sheet 1

INVENTOR.
Thomas P. Callahan
BY
Paul J. Ellington
ATTORNEY

March 28, 1961 T. P. CALLAHAN 2,976,720
APPARATUS FOR MEASURING THE VAPOR CONTENT OF FLUIDS
Filed April 9, 1959 3 Sheets-Sheet 2
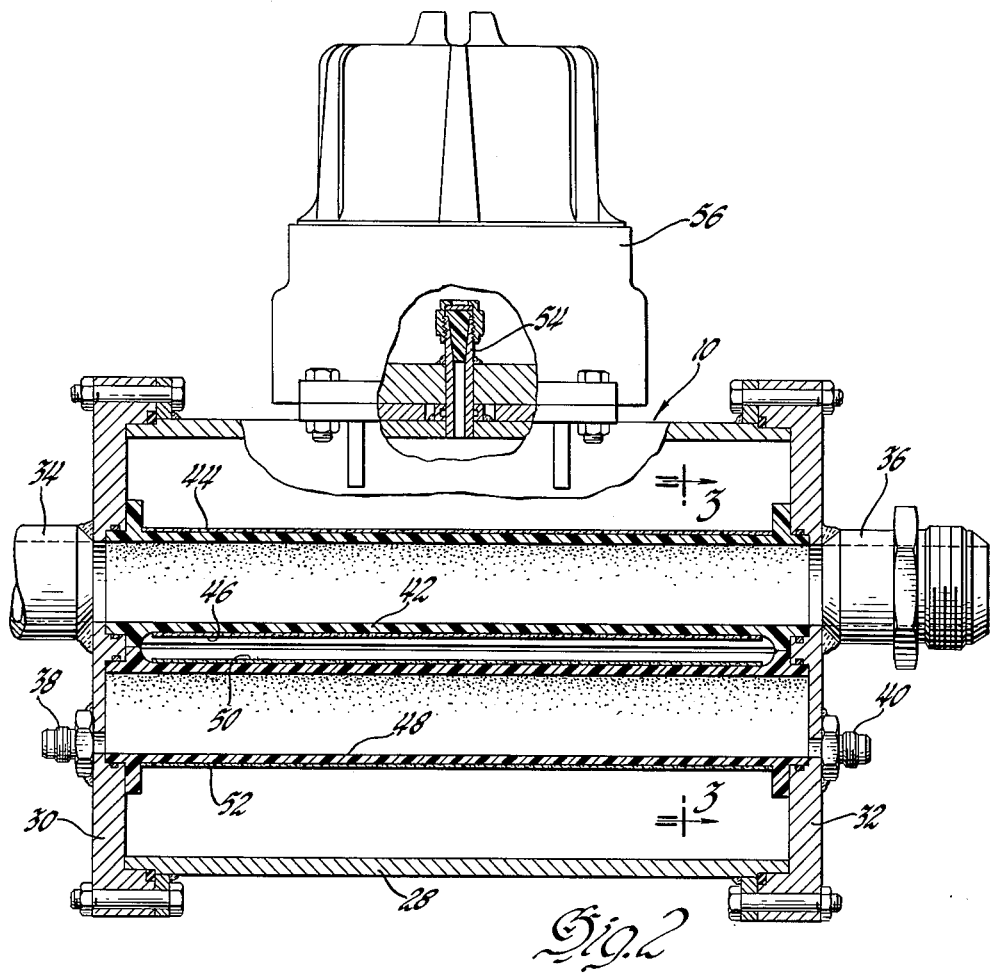
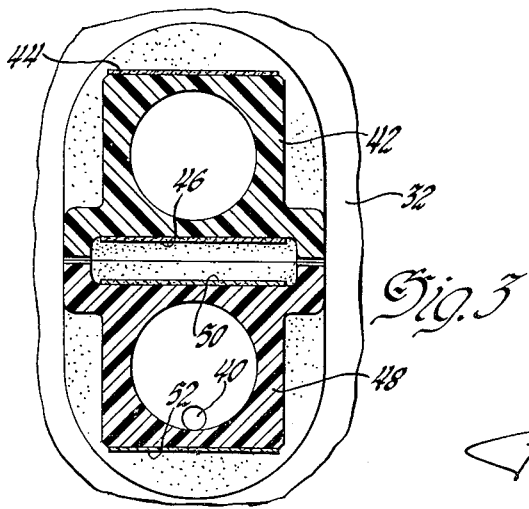
INVENTOR.
Thomas P. Callahan
BY
Paul J. Ethington
ATTORNEY March 28, 1961  T. P. CALLAHAN  2,976,720
APPARATUS FOR MEASURING THE VAPOR CONTENT OF FLUIDS
Filed April 9, 1959   3 Sheets-Sheet 3
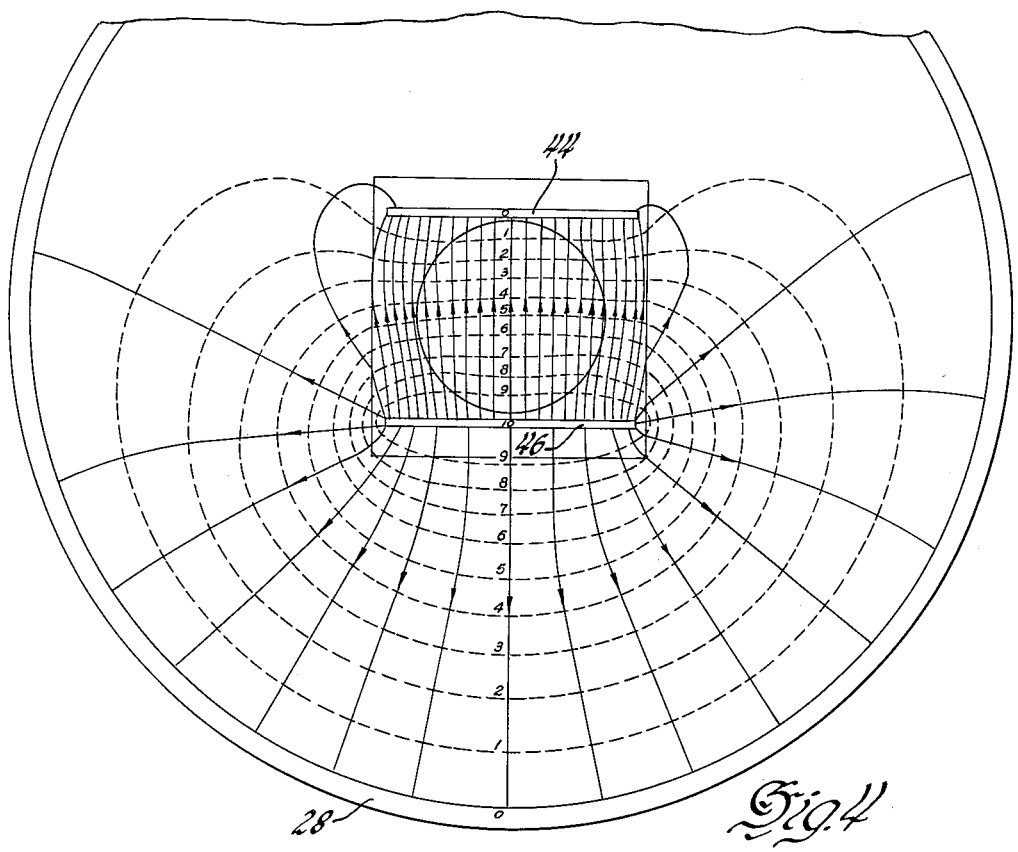
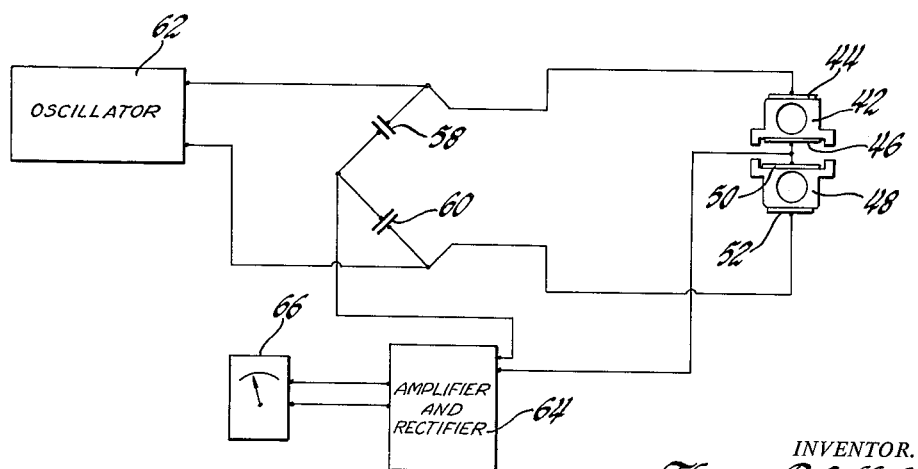
INVENTOR.
Thomas P. Callahan
BY
ATTORNEY United States Patent Office
2,976,720
Patented Mar. 28, 1961

2,976,720

APPARATUS FOR MEASURING THE VAPOR CONTENT OF FLUIDS

Thomas P. Callahan, Indianapolis, Ind., assignor to General Motors Corporation, Detroit, Mich., a corporation of Delaware Filed Apr. 9, 1959, Ser. No. 805,202

6 Claims. (Cl. 73—61)

This invention relates to a measuring apparatus and more particularly to apparatus for measuring the vapor content of a fluid.

In accordance with this invention, apparatus is provided to determine the vapor content of a liquid under dynamic or static conditions by using the dielectric constant of the liquid as an index of its vapor content. This is accomplished by a sensing device with a test liquid chamber between a pair of electrically conductive plates to form an electrical condenser and a circuit connected therewith for measuring the capacitance. By correlating the condenser plate configuration with the shape of the chamber and the dielectric constants of the chamber and fluid, a linear electric field is produced and the measurement is independent of vapor distribution in the liquid. Furthermore, a high sensitivity and a linear relation between capacitance and vapor content is realized. By the use of an auxiliary chamber containing a reference liquid in the same condition as the test liquid, except for vapor content, the condensers of the test chamber and reference chamber may be advantageously connected in a bridge circuit to obtain a differential output to further enhance the accuracy of measurement. The sensing device responds instantaneously to changes of vapor content and, thus, is especially well adapted for measurement under dynamic conditions by utilizing the test and reference chambers as flow conduits and continuously measuring the vapor content.

A more complete understanding of the invention may be had from the detailed description which follows taken from the accompanying drawings in which:

Figure 2 shows the sensing device with parts broken away to reveal the interior structure;

Figure 3 is a sectional view taken on lines 3—3 of Figure 2;

Figure 4 is a graphical representation of the electric flux lines and equipotential lines produced by the condenser plates of the sensing device;

Figure 5 is a schematic diagram of the apparatus.

Figure 1:
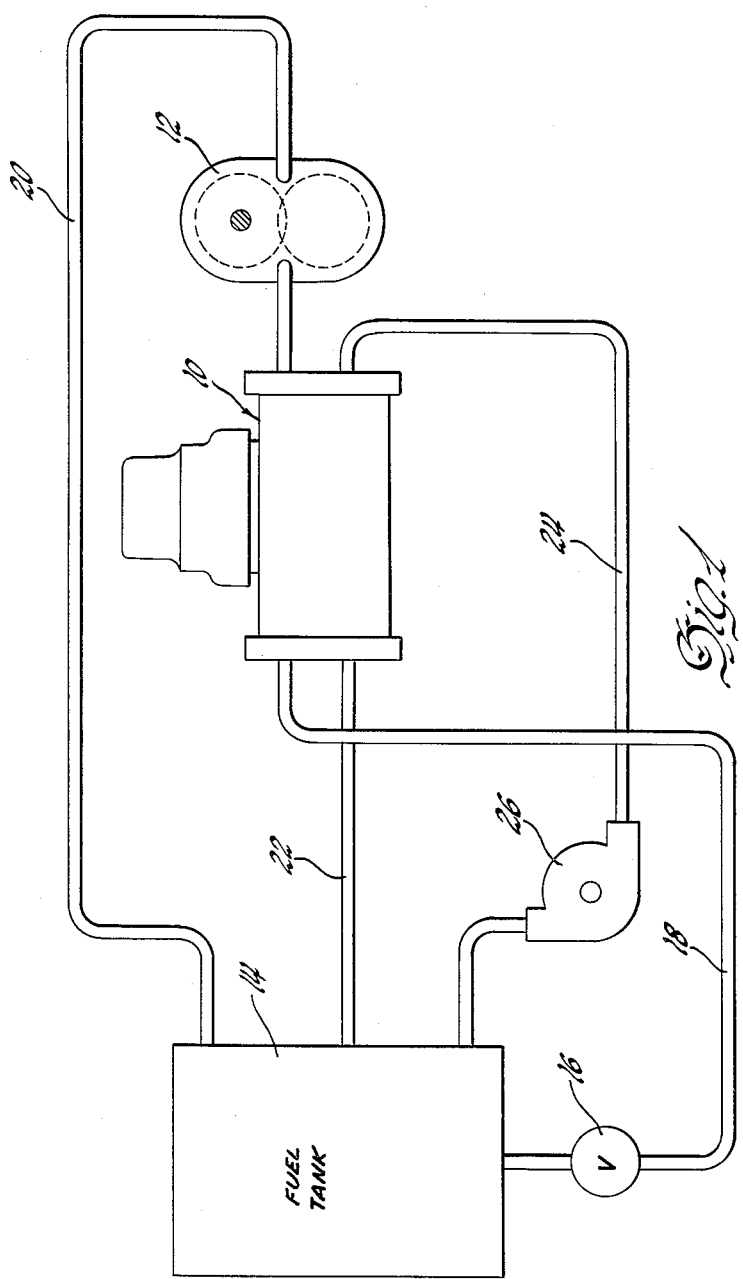
Figure 1 shows the sensing device in a particular system used for cavitation testing of fuel pumps.

Referring now to the drawings there is shown an illustrative embodiment of the invention in an apparatus for measuring the vapor content of a liquid. Figure 1 depicts a typical application of the invention in which a sensing device 10 is connected in a system for the cavitation testing of a gear pump 12 of the type employed for supplying hydrocarbon fuels to jet engines. To supply a test liquid, a fuel supply source or tank 14 is connected through a flow control valve 16 and a supply conduit 18 to one inlet of the sensing device 10 and thence to the inlet of pump 12. A return conduit 20 extends from the outlet of the pump to the fuel tank. The gear pump 12, which produces relatively high pressure at its outlet, introduces an appreciable vapor content into the liquid fuel at its inlet. To provide a reference liquid with a negligible or an arbitrarily fixed value of vapor content, a relatively low pressure pump 26, suitably a centrifugal pump, is connected in a supply conduit 24 to another inlet of the sensing device 10 and thence through a return conduit 22 to the fuel tank.

The sensing device 10, as shown in Figure 2, comprises a tubular housing 28 of cylindrical cross section which is closed at one end by a cover 30 and at the other end by a cover 32. The cover 30 is provided with a passage and an inlet fitting 34 for connection with the supply conduit 18. Similarly, the cover 32 is provided with a passage and an outlet fitting 36 for connection with the inlet of pump 12. The covers 30 and 32 are additionally provided with aligned openings and fittings 40 and 38 for connection with the supply conduit 24 and return conduit 22, respectively. Inside the housing, a test fluid chamber or conduit 42 extends between the inlet 34 and the outlet 36. The conduit 42 is constructed of insulating material, such as fiberglass or polystyrene and is provided with an interior surface of circular cross section and an exterior surface of rectangular cross section. A conductive plate 44 is disposed upon one exterior surface and a conductive plate 46 is disposed upon the opposite exterior surface of the conduit 42. The conduit 48 is constructed in a similar manner and provided with flat conductive plates 50 and 52 on opposite exterior surfaces. The conductive plates are suitably thin metal sheets formed by painting or spraying a metallic solution on the surfaces of the conduits. The plates 44 and 46, together with the conduit 42 and the fluid contained therein, form an electrical condenser having a capacitance value which varies with the dielectric constant of the fluid in the conduit. Likewise, plates 50 and 52 form an electrical condenser having a capacitance value which varies with the dielectric constant of the fluid in the conduit 48. The housing 28 is constructed of metal, such as aluminum, and provides an explosion resistant casing and serves as an electrical shield around the conductive plates. The plates are electrically connected to an external measuring circuit which will be described presently.

In many applications of vapor content measurement, the test fluid and hence the sensing head are subjected to a wide range of temperature variation. For example, in the testing of fuel pumps, the temperature may vary from —50° to +165° F. Under such conditions, accurate measurement of vapor content is exceedingly difficult since the dielectric constant of the test fluid, such as a hydrocarbon fuel, may change as much as 20 to 30 percent throughout such a temperature range. Furthermore, the dielectric constant of the material of the fluid chamber is temperature dependent and unless special provision is made the accuracy of measurement will be impaired. By utilizing the reference conduit 48, with the test conduit 42 and making a comparison measurement of the capacitance values, the effects of temperature variation are eliminated. Since the conduits are constructed of the same materials and the fluids conducted thereby are at the same temperatures, the difference in capacitance values arises only as a result of difference in vapor content of the fluids.

In order to obtain an accurate measurement of vapor content, the sensing head itself must not distort the fluid flow path in such manner that the resulting flow disturbance would introduce significant amounts of vapor. For systems using round bore tubing the desired continuity is achieved by sensing head conduits with round bores. Furthermore, it has been found that the measurement can be made independent of vapor distribution in the liquid by producing a linear electric field in the fluid. A linear electric field may be obtained by using flat condenser plates on the opposite surfaces of a conduit of rectangular external cross-section and having a round bore provided that the relation of the dielectric constants of the conduit material and fluid are correlated with the relative dimensions of the conduit. Where the dielectric constant of the conduit material is approximately equal to the dielectric constant of the fluid then the conduit should be of square external cross-section to produce a linear field. In general, as the ratio of the dielectric constant of the fluid to that of the conduit material increases, then the dimension of the conduit perpendicular to the condenser plates should be increased relative to the dimension parallel to the plates, in order to produce a linear electric field. Although a conduit material with a low dielectric constant relative to that of the fluid would enhance the sensitivity of measurement, the disparity would make it difficult or impractical to obtain a linear electric field. Therefore, it is desirable to obtain approximate equality of the dielectric constants so that the sensing head with a linear field is easy to fabricate. In a particular design, the conduits are constructed of glass fibre filled diallyl-phthalate molding compound having a dielectric constant of about 3.8 for use with a hydrocarbon fuel having a dielectric constant in the range of 1.8 to 2.1. With this relation of dielectric constants, the conduit is rectangular with a dimension of 1.8 inches on the side parallel to the condenser plate and 1.5 inches on the side perpendicular to the condenser plates and the bore is of 1.3 inches in diameter. For any particular design, the dimensions of the conduit may be determined by the well known field mapping technique using variable resistance paints on resistance paper. Such a technique is described in "Analog Methods in Computation and Simulation" by Soroka, McGraw Hill, 1958. The electrical condensers formed by the pair of flat plates 44 and 46 and the pair of flat plates 50 and 52 provide a linear electric field throughout the conduits, as shown in Figure 4, wherein the field is diagrammed to show uniformly spaced flux lines (unbroken lines) and equipotential lines (dashed lines). As a result of this linear field, the response of the sensing device is substantially independent of vapor distribution in the liquid. Furthermore, the sensitivity is actually better than that obtained with cylindrical plates, even though the total capacitance is decreased, because it is found that the change of capacitance for a given change of vapor content remains the same.

The measuring circuit includes the condenser formed by plates 44 and 46 and the condenser formed by plates 50 and 52 in one adjacent pair of arms of a bridge circuit which includes fixed condensers 58 and 60 of equal value in the other pair of adjacent arms. The bridge circuit is energized by an oscillator 62 connected across the input terminals of the bridge circuit and the signal voltage at the output terminals is applied to an amplifier and rectifier 64. When the vapor content of the test liquid is equal to that of the reference liquid, the bridge circuit is balanced and the signal voltage is zero. When the vapor content of the test liquid increases the dielectric constant changes and as a result the capacitance of the condenser formed by plates 44 and 46 changes and produces an unbalance signal voltage at the output terminals of the bridge circuit. This signal voltage is applied to an amplifier and rectifier 64 which produces a direct current signal proportional in magnitude to the percentage vapor in the liquid. The oscillator, amplifier, and rectifier circuits, as well as the bridge circuit components, are desirably contained within a sealed cover 56 on the sensing head. The sensing head is made explosion resistant by filling the housing 28 with an inert gas, such as nitrogen, at a pressure greater than atmospheric and connecting the condenser plates on the conduits through a sealed connector 54. This arrangement avoids the transmission of an alternating signal voltage or supply voltage and the introduction of spurious capacitance by the connection of the sensing head to a remote measuring circuit and oscillator through a transmission line. The direct current signal voltage is derived from the rectifier and applied to a meter or recorder 66 suitably calibrated in terms of percentage vapor.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

I claim:

1. A sensing device for measuring the relative quantities of vapor and liquid in a test fluid, said device comprising a tubular metallic housing including a pair of end covers on opposite ends of the housing and defining two pairs of aligned openings, a test fluid conduit of insulating material extending between said covers in registry with one of the pairs of aligned openings, a first condenser including a pair of flat conductive plates disposed on opposite sides of said test fluid conduit, a reference fluid conduit of insulating material extending between said end covers in registry with the other of the pairs of aligned openings, a second condenser including a pair of flat conductive plates disposed on opposite sides of said reference fluid conduit, and connector means in said housing to permit electrical connection of said condensers to an external circuit.

2. The combination defined in claim 1 wherein both of said conduits have external surfaces of substantially rectangular cross-sections, said flat conductive plates of each conduit being disposed upon opposite external surfaces thereof.

3. The combination defined in claim 1 wherein both of said conduits have internal surfaces of circular cross-section and external surfaces of substantially rectangular cross-section, said flat conductive plates of each conduit being disposed upon opposite external surfaces thereof and being substantially co-extensive with the axial length of the conduit and being wider than the inside diameter of the conduit.

4. A system for cavitation testing of liquid pumps; a liquid supply source, a test pump, a supply conduit connected between the supply source and the inlet of said pump, a sensing device including a test fluid conduit of insulating material interposed in said supply conduit, a pair of conductive plates disposed on opposite sides of the test fluid conduit to form an electrical condenser having the test fluid conduit and the pump supply fluid in the electric field of the condenser, and an electrical capacitance measuring circuit connected with said condenser.

5. A system for cavitation testing of a liquid pump; a liquid supply source, a test pump, a first supply conduit connected between the supply source and the inlet of said pump, a sensing device including a test fluid conduit of insulating material interposed in said supply conduit, a pair of conductive plates disposed on opposite sides of the test fluid conduit to form a first electrical condenser, a reference fluid conduit of insulating material, a second supply conduit connected between the supply source and the reference fluid conduit and including means for producing therein a flow of liquid in a reference condition from the supply source, a pair of conductive plates disposed on opposite sides of the reference fluid conduit to form a second electrical condenser, a bridge circuit including said condensers in adjacent arms of the bridge circuit, an oscillator connected across the input terminals of the bridge circuit, said bridge circuit being balanced when the test fluid is in the reference condition, and measuring means connected across the output terminals of the bridge circuit and responsive to the unbalance signal therefrom for indicating the change of capacitance of the first condenser as an indication of the vapor to liquid ratio of the test fluid.

6. The combination defined by claim 5 wherein the conductive plates of each pair are flat and parallel to each other, and a conductive shield spaced from and enclosing said test and reference fluid conduits.

References Cited in the file of this patent

UNITED STATES PATENTS

| | | |
|---|---|---|
| 2,083,074 | Maass | June 8, 1937 |
| 2,700,901 | | |
| 2,845,790 | | |
| | Rickner | Feb. 1, 1955 |
| | Eddy | Aug. 5, 1958 |

FOREIGN PATENTS

| | | |
|---|---|---|
| 158,105 | Germany | Feb. 15, 1905 |
| 987,863 | France | Apr. 18, 1951 |